US012614953B2

(12) United States Patent
    Janjic

(10) Patent No.: US 12,614,953 B2
(45) Date of Patent: Apr. 28, 2026

(54) ELECTRIC MOTOR

(71) Applicant: KSB SE & Co. KGaA, Frankenthal (DE)

(72) Inventor: Boris Janjic, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 762 days.

(21) Appl. No.: 17/292,900

(22) PCT Filed: Nov. 7, 2019

(86) PCT No.: PCT/EP2019/080576
    § 371 (c)(1),
    (2) Date: May 11, 2021

(87) PCT Pub. No.: WO2020/099239
    PCT Pub. Date: May 22, 2020

(65) Prior Publication Data
    US 2021/0408871 A1      Dec. 30, 2021

(30) Foreign Application Priority Data
    Nov. 12, 2018    (DE) ..................... 10 2018 219 253.7

(51) Int. Cl.
    *H02K 9/193*          (2006.01)
    *H02K 5/15*           (2006.01)
    (Continued)

(52) U.S. Cl.
    CPC .............. *H02K 9/193* (2013.01); *H02K 5/15* (2013.01); *H02K 5/203* (2021.01); *H02K 9/20* (2013.01); *H02K 9/225* (2021.01); *H02K 11/33* (2016.01)

(58) Field of Classification Search
    CPC .. H02K 9/00; H02K 9/12; H02K 9/16; H02K 9/18; H02K 9/19; H02K 9/20; H02K 9/22;
    (Continued)

(56) References Cited

U.S. PATENT DOCUMENTS 4,834,624 A      5/1989  Jensen et al.
    5,971,725 A  *  10/1999  de Simon  ............... F04D 19/04
                                                       417/423.8
    (Continued)

FOREIGN PATENT DOCUMENTS

CN          1292165 A      4/2001
    CN          104979936 A    10/2015
    (Continued)

OTHER PUBLICATIONS

International Search Report (PCT/ISA/210) issued in PCT Application No. PCT/EP2019/080576 dated Feb. 19, 2020 with English translation (five (5) pages).
    (Continued)

*Primary Examiner* — Christopher M Koehler
*Assistant Examiner* — Ahmed F Seck
(74) *Attorney, Agent, or Firm* — Crowell & Moring LLP

(57)          ABSTRACT

An electric motor arrangement for a pump includes power electronics for control of the electric motor driving the pump. For cooling of the electric motor and/or the power electronics, media from a pump chamber of the pump casing flows through a suction-side connection, a coolant channel associated with the power electronics and/or of the electric motor, to a pressure-side connection of the pump. The flow in the coolant channel may be controlled by a thermostat valve.

4 Claims, 4 Drawing Sheets

(51) Int. Cl.
    *H02K 5/20*         (2006.01)
    *H02K 9/20*         (2006.01)
    *H02K 9/22*         (2006.01)
    *H02K 11/33*       (2016.01)

(58) Field of Classification Search
CPC .......... H02K 9/25; H02K 9/33; H02K 9/193;
H02K 9/203; H02K 9/223; H02K 9/225;
H02K 9/227; H02K 5/04; H02K 5/08;
H02K 5/10; H02K 5/12; H02K 5/20;
H02K 5/128; H02K 5/203; H02K 5/207;
H02K 5/225; H02K 11/25; H02K 11/33;
H02K 2205/09; H02K 2207/03; H02K
2209/00; H02K 7/1823; H02K 7/1838;
H02K 3/50; H02K 2211/03; H02K
2203/03; H02K 17/03; H02K 1/32; H02K
1/2773; F04D 13/02; F04D 13/04; F04D
13/06; F04D 13/062; F04D 13/0626;
F04D 13/0686; F04D 1/06; F04D 29/026;
F04D 29/32; F04D 29/40; F04D 29/406;
F04D 29/42; F04D 29/4213; F04D
29/4273; F04D 29/4293; F04D 29/466;
F04D 29/468; F04D 29/486; F04D 29/58;
F04D 29/586; F04D 29/5866; F04D
29/605; F04D 29/628; F04D 29/669;
F04D 29/5813; F04D 29/5806; F04D
29/086
See application file for complete search history.

(56) References Cited

U.S. PATENT DOCUMENTS

| | | | |
|---|---|---|---|
| 5,997,261 A | 12/1999 | Kershaw et al. | |
| 6,326,709 B1 | 12/2001 | Adelmann et al. | |
| 2004/0062664 A1* | 4/2004 | Weigold ............. | F04D 13/0626 417/357 |
| 2005/0047933 A1 | 3/2005 | Ottoboni | |
| 2005/0168081 A1* | 8/2005 | Takenaka ............... | H02K 11/33 310/75 R |
| 2006/0104840 A1* | 5/2006 | Queirel .................. | F04B 17/00 417/423.1 |
| 2010/0006264 A1* | 1/2010 | Jadric ..................... | F04D 25/06 165/104.19 |
| 2012/0206879 A1 | 8/2012 | Herber et al. | |
| 2015/0152775 A1* | 6/2015 | Ando ...................... | F01P 7/165 165/287 |
| 2015/0300355 A1* | 10/2015 | Malvasi .................. | F01C 21/10 |
| 2015/0369258 A1 | 12/2015 | Sakamoto et al. | |
| 2016/0123637 A1* | 5/2016 | Moreno .................. | F25B 39/02 62/516 |
| 2017/0167491 A1* | 6/2017 | Reul ........................ | F04B 17/03 |
| 2018/0238348 A1* | 8/2018 | Pawellek ............ | F04D 13/0686 |

FOREIGN PATENT DOCUMENTS

| | | | | |
|---|---|---|---|---|
| DE | 36 42 729 A1 | 6/1988 | | |
| DE | 37 38 592 C1 | 5/1989 | | |
| DE | 198 46 737 A1 | 4/2000 | | |
| DE | 698 04 745 T2 | 11/2002 | | |
| DE | 10 2007 036 240 A1 | 2/2009 | | |
| DE | 10 2008 034 175 A1 | 1/2010 | | |
| EP | 2 498 386 A1 | 9/2012 | | |
| EP | 2 508 051 B1 | 7/2013 | | |
| GB | 2 401 487 A | 11/2004 | | |
| JP | 2007-211695 A | 8/2007 | | |
| WO | WO 2015/195411 A1 | 12/2015 | | |
| WO | WO 2016162571 A1 * | 4/2016 | ........... | A61M 5/347 |

OTHER PUBLICATIONS

German-language Written Opinion (PCT/ISA/237) issued in PCT Application No. PCT/EP2019/080576 dated Feb. 19, 2020 (five (5) pages).
German-language Office Action issued in German Application No. 10 2018 219 253.7 dated Oct. 22, 2019 (4 pages).
Chinese-language Office Action issued in Chinese Application No. 201980074421.X dated Aug. 28, 2024 with partial English translation (10 pages).
Hindi-language Office Action issued in Indian Application No. 202137020917 dated Feb. 4, 2026 with English translation (7 pages).

* cited by examiner

ELECTRIC MOTOR

BACKGROUND AND SUMMARY OF THE INVENTION

The invention relates to an electric motor in connection with a pump and an electronic component.

In an electric motor and the associated power electronics, higher or lower losses are generated during operation, depending on the load, and heat is thus released. Unacceptably high heating results in damage to the motor and to the electronics. To increase the power density of the drive, the designer of a regulated drive is constantly looking for suitable measures to dissipate the heat from the drive.

US 2005 0047 933 A1 discloses a motor pump in which the delivery medium is conducted through a multi-walled pump casing.

WO 2015/195 411 A1 discloses an arrangement of the power electronics in a pump casing, which is intended to ensure cooling via a delivery medium.

JP 2007 211 695 A1 discloses the cooling mechanism of a cooling element which absorbs the heat of the power electronics and is cooled by a delivery medium.

The object of the invention is to further develop a cooling system for an electric motor in connection with power electronics and a pump, which can be produced in a simple and cost-effective manner.

This object is achieved by an electric motor having connected power electronics and a pump, comprising a pump chamber having a suction-side and a pressure-side connection, according to claim one, wherein a cooling device of the power electronics and/or the motor is connected to the pump chamber. This is advantageous in that the cooling of the electric motor and the connected power electronics can be undertaken by the delivery fluid of the pump. Depending on the temperature of the delivery fluid, very efficient cooling is possible here. The power density of the unit, i.e. motor and power electronics and pump, can be further increased as a result of this more efficient cooling.

In one configuration of the invention, the cooling is realized as liquid cooling, wherein the cooling liquid is provided by the delivery fluid delivered by the pump. This has the advantage that the liquid acts as cooling liquid with a high heat capacity compared to the ambient air conventionally used when cooling takes place by means of a fan.

In a further configuration of the invention, a coolant channel is provided to guide the cooling liquid in or on the power electronics. This has the advantage that the cooling liquid can be guided to individual components.

Particularly advantageous is a configuration in which the cooling liquid runs from the pressure-side connection of the pump casing through the coolant channel to the suction-side connection of the pump casing. This has the effect that the cooling liquid is introduced into the coolant channel under the pressure which is built up by the pump, whilst the cooling liquid is simultaneously drawn to the other end of the cooling channel under the suction of the suction side of the pump. The heated delivery fluid which has served as cooling fluid is mixed into the remaining delivery fluid on the suction side of the pump.

In a further configuration, cooling of the electric motor is provided, wherein a coolant channel is provided in or on the electric motor. The coolant channel branches at the end shields of the electric motor and extends as parallel axial channels through the stator casing or in a manner adapted to this. In this case, it is necessary in each case to balance the influence which a coolant channel has on the electromagnetic properties of the electric motor or the power electronics and the benefits which are brought by the specific cooling of certain points.

The interconnection of the coolant channels can be undertaken in the two end shields, which can be composed of a plurality of parts. The course of the cooling medium through individual regions of the drive can be established within the framework of designing the drive.

In this regard, in a further configuration, heat pipes can be provided on components of the power electronics and/or the electric motor which are remote from the coolant channel, which heat pipes are connected to the coolant channel for cooling purposes. Specific hotspots, i.e. points with a greater heat input which might not be easily reached by a coolant channel, can thus be cooled, wherein the cold part of the heat pipe can be cooled into the coolant.

In a further configuration, a control element for establishing the flow rate, in particular a thermostat valve, is provided in the supply line. This has the advantage that only the amount of coolant required based on the heating of the electric motor or the power electronics is diverted from the delivery fluid.

In a further configuration, the suction-side and pressure-side connections can be retrofitted on existing pump casings by means of adapters. This has the advantage that a cooling system according to the invention can be retrofitted; in particular, in the case of pumps, adapters can be mounted on the ports of the suction and pressure side which have the connections for diverting the coolant.

Further features and advantages of the invention are revealed in the description of exemplary embodiments with reference to drawings and in the drawings themselves.

DETAILED DESCRIPTION

Figure 1:
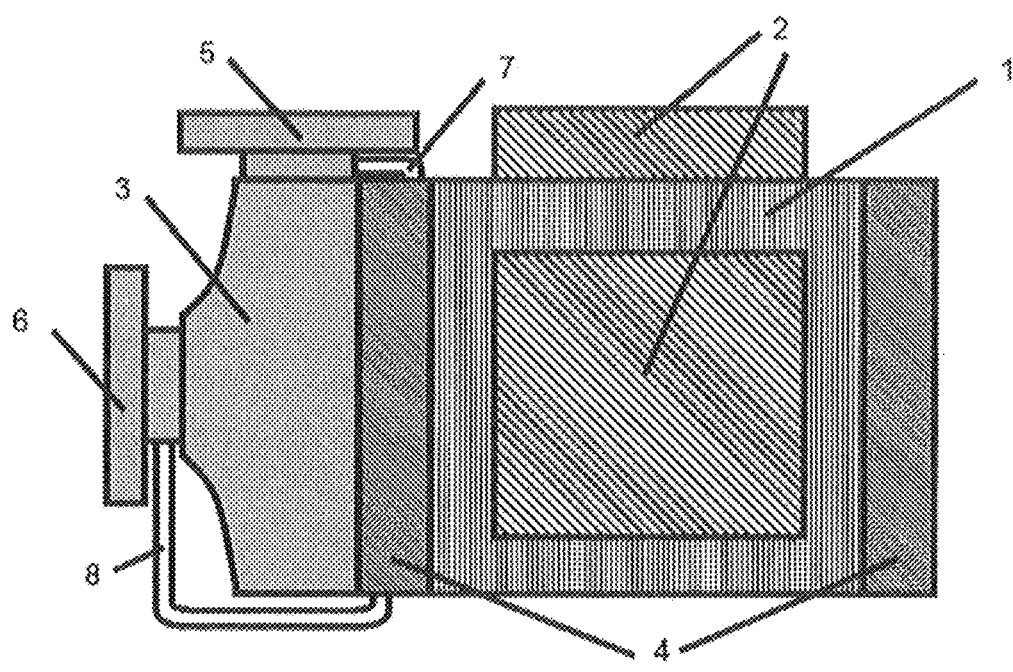
FIG. 1 shows the basic construction of a pump in longitudinal section.

FIG. 1 shows an electrically driven pump, which is equipped with an electric motor 1 and power electronics 2. The pump can be a centrifugal pump, for example, with other pump types likewise being possible. The illustrated pump has a pump casing 3, which is flange-connected to one of the end shields 4 of the electric motor. Moreover, connections for fluid lines are provided on the pump casing 3; a respective connection for the pressure side 5 and the suction side 6. The supply line 7 and the return line 8 of the cooling system are provided at these connections. Therefore, cold delivery fluid is impressed into the coolant channel on the pressure side 5; on the suction side 6, the delivery fluid is then fed back into the flow of the delivery fluid. The supply line 7 and the return line 8 of the cooling system can be located both inside and outside the pump casing.

Figure 2:
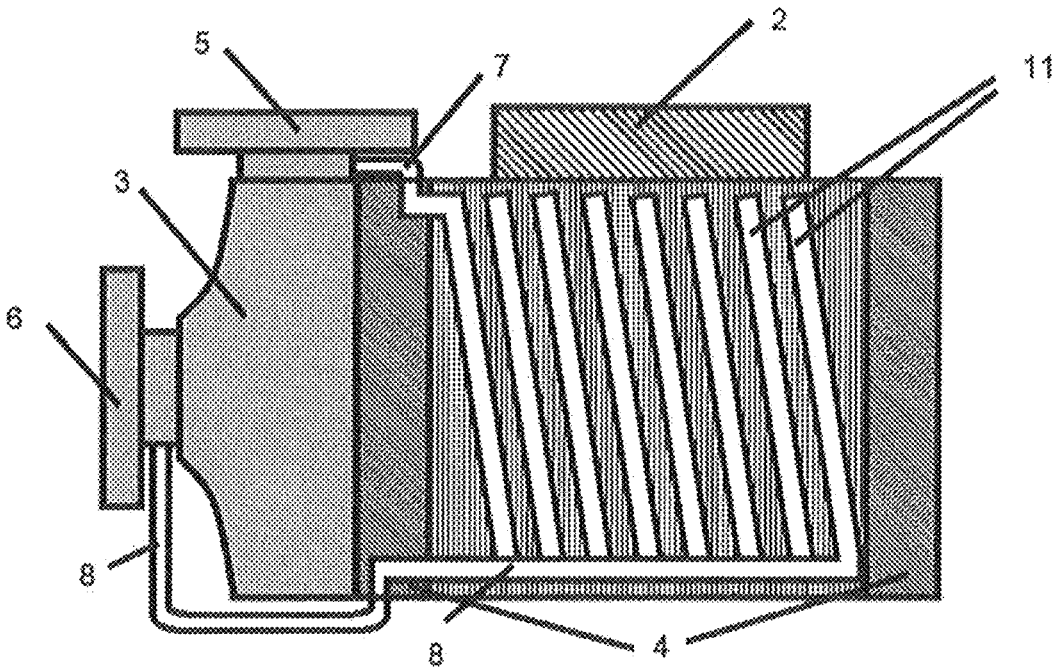
FIG. 2 shows a first configuration of a pump according to an embodiment of the invention in longitudinal section.

FIG. 2 shows an axial illustration of a pump according to the invention, having spiral coolant channels 11 which are connected directly to the supply line 7 and the return line 8. The coolant channel 11 is routed around the electric motor, wherein the coolant channel 11 can be arranged externally on the casing of the electric motor 1 and/or between the electric motor 1 and the power electronics 2.

Figure 3:
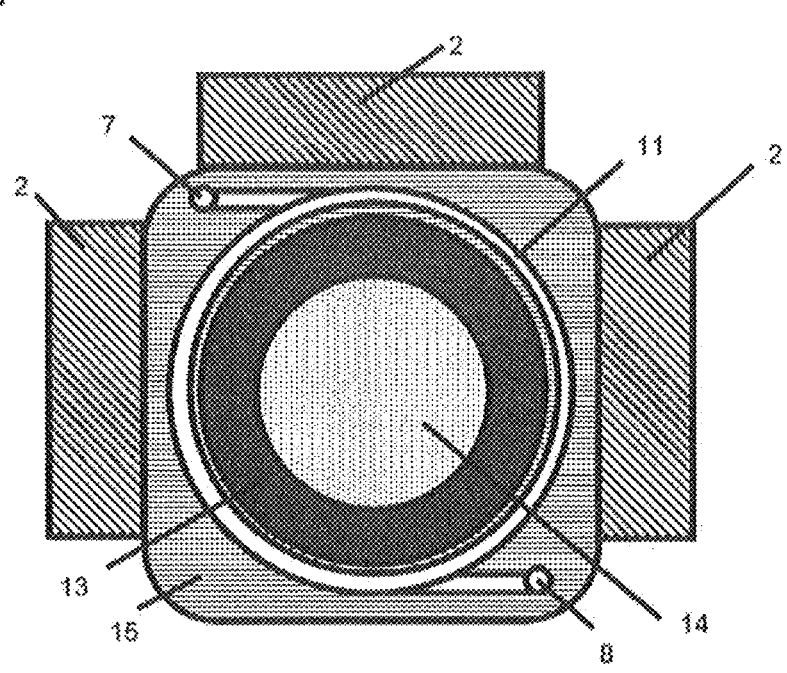
FIG. 3 shows an associated cross-section of the pump in FIG. 2.

FIG. 3 shows a section through the electric motor 1 and the power electronics 2, wherein the arrangement of the spiral coolant channels 11 around the stator 13 in the motor casing 15 should be noted in particular. The rotor 14 of the electric motor is likewise illustrated schematically. The spiral coolant channel 11 has the two connections: supply line 7 and return line 8.

Figure 4:
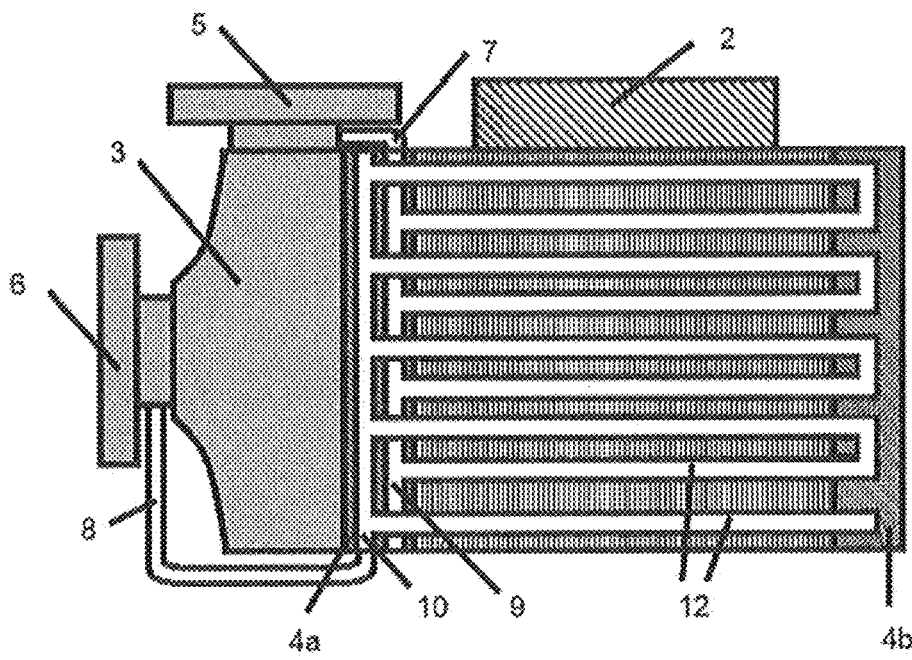
FIG. 4 shows a second configuration of a pump according to another embodiment of the invention in longitudinal section.

FIG. 4 shows an axial illustration of the pump according to the invention, having axial coolant channels 12. In the pump-side A end shield 4*a*, the still cool delivery fluid is distributed to the individual regions of the coolant channels 12 via a central cold water collection ring 9, which is provided on the pressure side 6. In the opposing B end shield 4*b* of the electric motor, the coolant flow is deflected and conducted back into the A end shield 4*a* again via the coolant lines 12, where it is supplied to the return line 8 by means of a hot water collection ring 10. From here, the coolant is supplied to the delivery medium again via the suction side 6, wherein good mixing can already be achieved in a quick and simple manner, depending on the flow rate.

Figure 5:
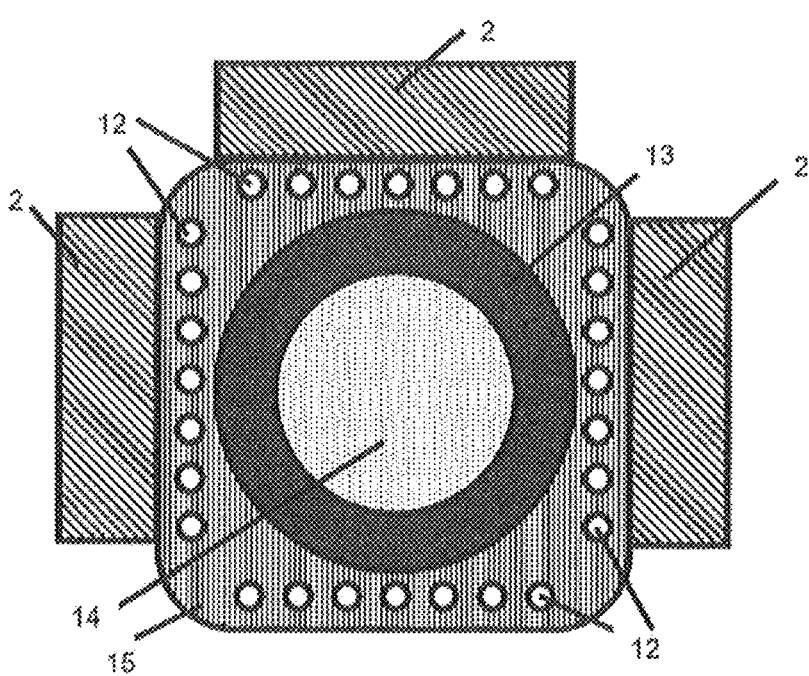
FIG. 5 shows a second associated cross-section of the pump in FIG. 4.

FIG. 5 shows a section through the electric motor and the power electronics 2 with axial coolant channels 12 in the motor casing 15. Depending on requirements and the manufacturability, the coolant channels 12 can be arranged closer to the stator 13 or further away. The distribution of the cooling medium can take place, here and in the following examples, as disclosed above via specific configurations of the conduit in the end shields. In particular, the disclosed cold and hot water collection rings can be used. Corresponding end shields can be produced as required by means of 3D printing processes or they can be alternatively equipped with pipelines located outside the casing.

Figure 6:
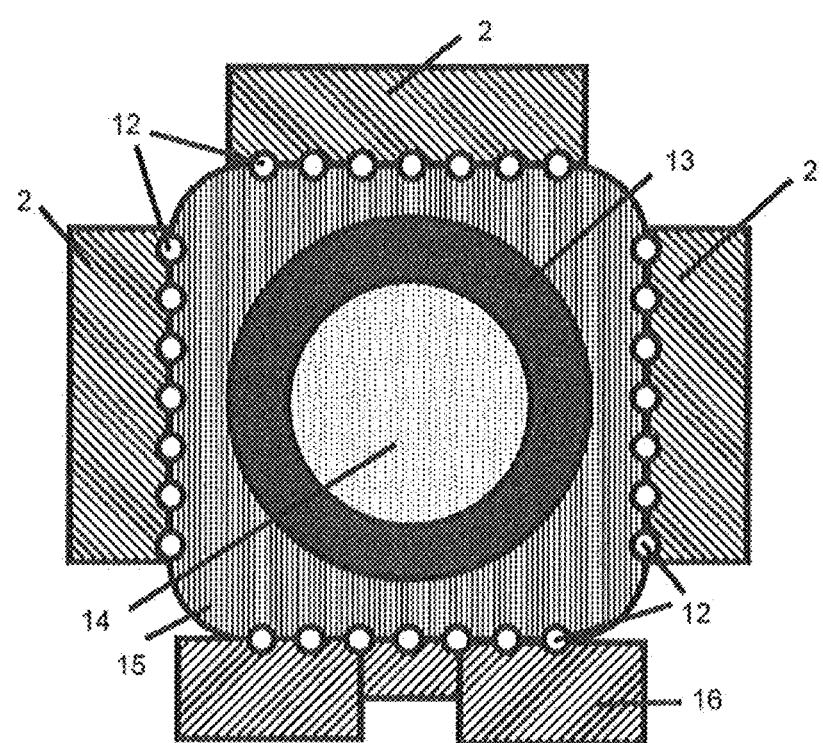
FIG. 6 shows a third associated cross-section of the pump according to another embodiment of the invention.

FIG. 6 shows a section through the electric motor and the power electronics 2 with axial coolant channels 12, some in the motor casing 15 and/or some in the motor feet 16 and/or some in the electronics casing 2. The production of such coolant channels is producible in a simple and cost-effective manner; moreover, very good thermal coupling of regions to be cooled is realized.

Figure 7:
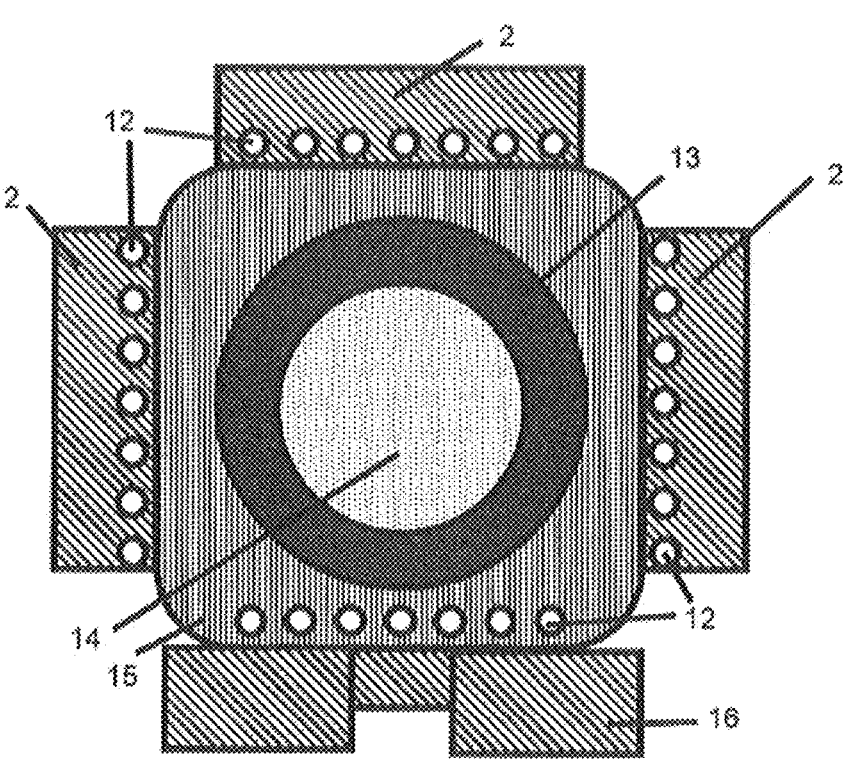
FIG. 7 shows a fourth associated cross-section of the pump according to another embodiment of the invention.

FIG. 7 shows a section through the electric motor and the power electronics 2 with axial coolant channels 12, some in the motor casing 15 and/or some in the electronics casing 2. In this case, the cooling can also be undertaken at points where it appears specifically necessary. Therefore, for example, a control electronics module may not particularly need to be cooled, whereas a power electronic module may require particular cooling.

Figure 8:
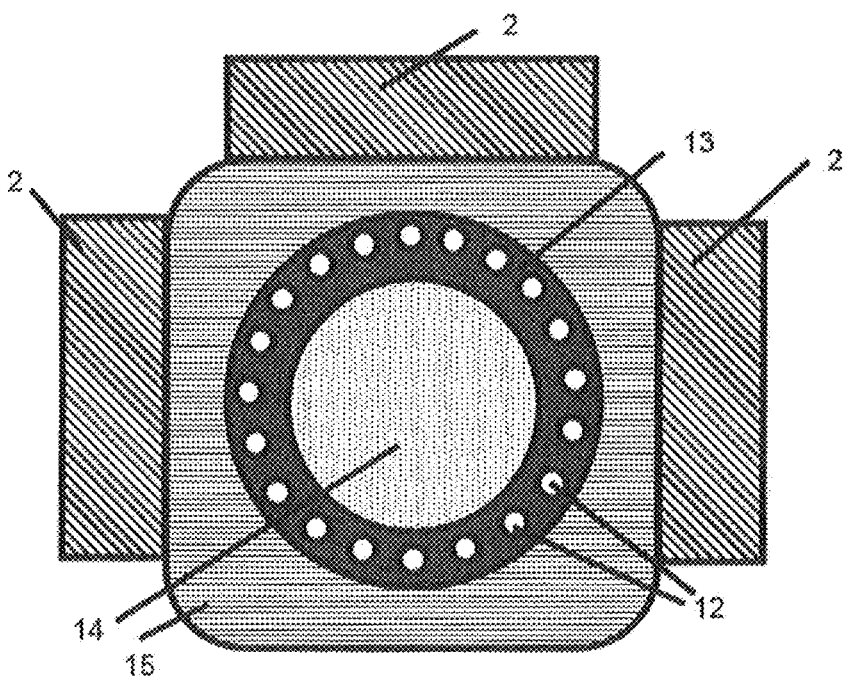
FIG. 8 shows a fifth associated cross-section of the pump according to another embodiment of the invention.

FIG. 8 shows a section through the electric motor and the power electronics 2 with axial coolant channels 12 in the stator 13 of the motor. It goes without saying that combinations of the illustrated arrangements can also be envisaged. The cooling of the stator, motor casing, end shields and electronic modules can be provided and combined accordingly, depending on requirements.

LIST OF REFERENCE SIGNS

1 Electric motor
 2 Power electronics
 3 Pump casing
 4 End shield
 5 Pressure side
 6 Suction side
 7 Supply line
 8 Return line
 9 Cold water collection ring
 10 Hot water collection ring
 11 Spiral coolant channel
 12 Axial coolant channel
 13 Stator
 14 Rotor
 15 Motor casing
 16 Motor feet

The invention claimed is:

1. An electric motor arrangement comprising:
an electric motor having a casing;
power electronics;
a pump, the pump having a pump chamber with a suction-side connection and with a pressure-side connection;
a liquid cooling device configured to provide cooling to the power electronics and to the electric motor, wherein
the liquid cooling device is connected to the pump chamber,
the liquid cooling device effects the cooling with a fluid delivered by the pump,
a coolant channel is routed around the electric motor,
the coolant channel is arranged externally on the casing of the electric motor and between the electric motor and the power electronics,
the fluid runs from the pressure-side connection through the coolant channel to the suction-side connection,
connections for fluid lines are provided on the casing,
the coolant channel has the two connections, a supply line and a return line,
the supply line is connected to the pressure-side connection,
the return line is connected to the suction-side connection,
the cooling channel is spiral-shaped,
heat pipes are provided on components of the power electronics and the electric motor, the heat pipes being separated from the coolant channel,
the heat pipes are connected to the coolant channel to effect a cooling effect; and
a control element configured to control a flow rate is provided in the supply line and in the coolant channel.

2. The electric motor arrangement according to claim 1, wherein the control element is a thermostat valve.

3. The electric motor arrangement according to claim 1, wherein the suction-side connection and the pressure-side connection are retrofittable on existing pump casings via adapters.

4. The electric motor arrangement according to claim 2, wherein the suction-side connection and the pressure-side connection are retrofittable on existing pump casings via adapters.

\* \* \* \* \*